May 4, 1965      C. C. DAVIS      3,181,835

BLADE VIBRATION DAMPING DEVICE

Filed Jan. 7, 1964

INVENTOR.
CARROLL C. DAVIS
BY
ATTORNEYS

United States Patent Office 3,181,835
Patented May 4, 1965

3,181,835
BLADE VIBRATION DAMPING DEVICE
Carroll C. Davis, Hartford, Conn., assignor, by mesne assignments, to the United States of America as represented by the Secretary of the Air Force
Filed Jan. 7, 1964, Ser. No. 336,321
4 Claims. (Cl. 253—77)

This invention relates to vibration damping and, more specifically, to damping devices for use on rotating wheel-blade assemblies in machinery operating at high rotative speeds. The damping device to be disclosed has particular application in damping the vibration of the blades in high speed fluid transfer machines such as turbojet engines and axial flow compressors.

One object of the present invention is to provide a damping device actuatable against an individual blade.

Another object of the present invention is to provide a damping device utilizing centrifugal force.

Yet another object of the present invention is to provide a damping device which may be contained within a wheel structure of a high speed fluid transfer machine.

Still another object of the present invention is to provide a damping device in which all elements have the utmost simplicity and are without critical manufacturing tolerances.

Additional objects, advantages and features of the invention reside in the construction, arrangement and combination of parts involved in the embodiment of the invention as will appear from the following description and accompanying drawings, wherein.

Figure 1:
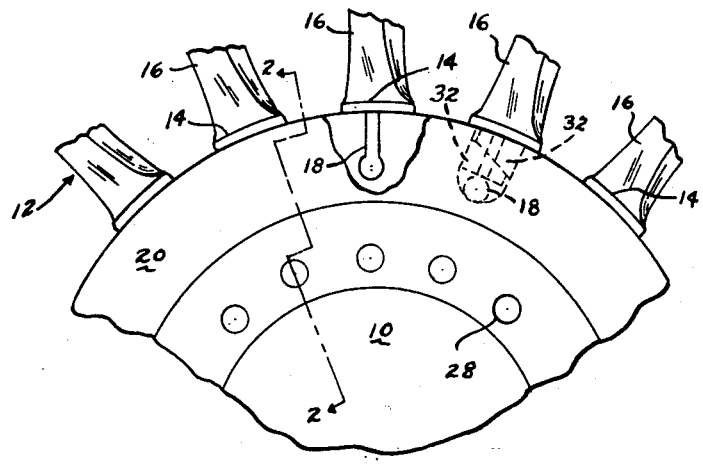
FIG. 1 is a fragmentary side view of a wheel-blade assembly as used on a typical fluid transfer machine, and partly broken to show one method of attaching the blades to the wheel, and further showing by dotted lines, the relationship between the damping device and the wheel-blade elements.
Figure 2:
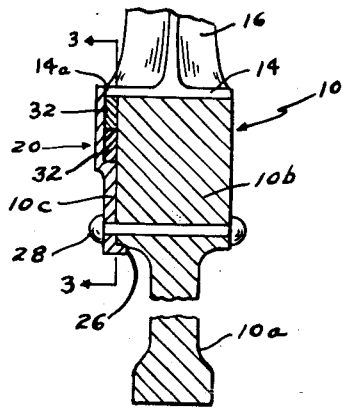
FIG. 2 is a cross-sectional view taken on line 2—2 of FIG. 1.

Referring to the drawing and, in particular, to FIG. 1 and FIG. 2, there is shown in fragmentary view a typical wheel-blade assembly for rotating about a central axis and having a wheel 10, comprising a wheel disk 10a radially terminating in a circular wheel rim 10b having an axial width greater than the wheel disk. Radially extending from the periphery of the wheel rim are a plurality of axially detachable fluid engaging blades 12. Each of said blades comprises a blade platform 14 having an air foil portion 16 joined to the upper side of the blade platform and a root portion 18 joined to the lower side of the blade platform and slidably engaging a substantially axial slot on the periphery of the wheel for retaining the blade in radial and axial engagement with the wheel. The blades are normally joined to have the lower side of the blade platform in close proximity with but not touching the periphery of the wheel. Either, or both, the root portion 18 on the blade 12 and the slot in the wheel for engaging the root portion, have a slight taper. The blade may be inserted only from one end of the slot; and when the machine is in operation, thrust against the air foil portion of the blade will hold the blade in firm axial engagement with the wheel. Blades as contemplated for use with this invention utilize a blade platform having a trailing edge protruding from the face of the wheel first engaged when the blade is inserted into the slot in the wheel. This is best shown on FIG. 2 where the trailing edge 14a of the blade platform is shown protruding from the leading face 10c of the wheel.

Joined to the leading face 10c on the wheel rim 10b as best shown on FIG. 2 is a pierced disk member 20. Now referring to FIG. 5, the pierced disk member 20 has an inner face 20a and an outer face 20b; and further has a central circular hub portion 22 of substantially the same diameter as the wheel 10, a circular rim portion 24 of reduced thickness circumferentially extending from the periphery of the circular hub portion and flush with the outer face 20b of the disk member 20, and a circular retaining flange 26 axially extending from the inner face 20a at the inside diameter of the pierced disk member 20. The pierced disk member 20 may be joined to the leading face 10c of the wheel by any convenient means such as rivets 28. When joined to the wheel rim as shown on FIG. 2, the perimeter of the central circular hub portion 22 will be proximate to the lower side of the protruding trailing edge of the blade platform, the circular rim portion 24 will be axially adjacent to the trailing edge of the blade platform to retain each blade in the wheel, and the circular retaining flange 26 will coaxially engage the inside diameter of the wheel rim. The circular retaining flange, engaging the wheel rim as shown on FIG. 2, coaxially locates and retains the disk member 20 in proper position and prevents shear stress in the rivets 28.

Figure 3:
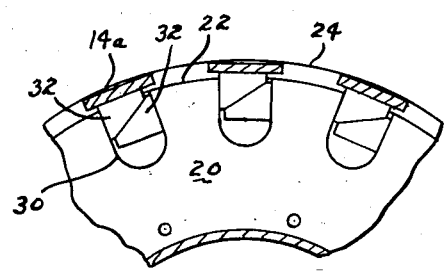
FIG. 3 is a fragmentary side view taken on line 3—3 of FIG. 2, showing the position of the weights under the influence of centrifugal force when the fluid transfer machine is operating at normal speed.
Figures 4, 5:
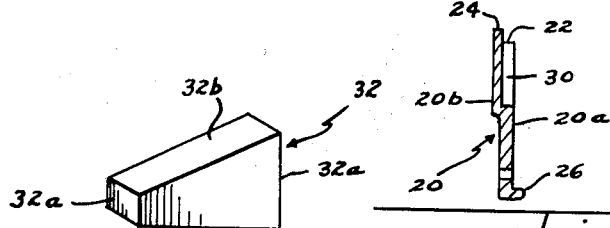
FIG. 4 is a perspective of one of the weights.
FIG. 5 is a cross-sectional view of the pierced disk member only, identical with the view of the disk member on FIG. 2.

The central circular hub portion 22 of disk member 20 contains a plurality of radial slots 30, as best shown on FIG. 3 and FIG. 5. The number of radial slots 30 corresponds with the number of blades in the wheel, and are circumferentially spaced to place a slot directly below each blade platform. Each slot is open at the periphery and the inner face 20a of the hub portion 22 of the disk member 20 and has parallel sides perpendicular to the inner face 20a. It is noted that when the disk member is joined to the wheel as shown, the radial slots become closed cavities and will retain any objects placed therein.

Movably retained within each radial slot 30 are two flat weights 32. As best shown on FIG. 4, each of the weights has opposing parallel edges 32a which in use are adjacent to the parallel sides of the radial slot. Each weight is somewhat narrower than the slot to provide a spaced relationship allowing the weight to have a limited lateral movement within the slot, as best shown on FIG. 3. Each weight is further provided with an oblique edge 32b which engages a like oblique edge on the other weight within each slot.

During normal operation of the machine, the wheel is rapidly rotating; and centrifugal force forceably brings the weights in each slot into engagement with the sides of the radial slot through lateral movement with each other along the oblique edges, and one weight into simultaneous engagement with the lower side of the protruding blade platform to thereby dampen any vibration in the rotating wheel-blade assembly. The relationship between elements during operation is best shown on FIG. 3, where it will be observed that the widest edge 32a of each weight engages one side of the slot. On machine shut-down, the weights are free to assume any position within the slot as dictated by wheel position and the force of gravity.

A pair of weights has been shown and disclosed to act upon a single blade. Without departing from the invention, the arrangement of elements may be made to stagger the weights and slots between adjacent blades, thus causing each pair of weights to simultaneously act on two adjacent blades. When using the staggered arrangement, the number of slots and weights may remain the same as in the disclosed arrangement or the number of slots and weights required may be reduced by onehalf by having a single slot with weights acting upon two paired adjacent blades.

It is to be understood that the embodiment of the present invention as shown and described is to be regarded as illustrative only and that the invention is susceptible to variations, modifications and changes within the scope of the appended claims.

I claim:

1. The combination in a fluid transfer machine comprising: a rotor wheel having axially spaced end faces and axially extending dovetail slots in the periphery of said rotor wheel; a plurality of axially detachable fluid engaging blades radially extending from the periphery of said rotor wheel, each of said blades having a platform extending between the axially spaced end faces of said rotor wheel and protruding over one end face with the radially inner surface of the platform slidably engaging the peripherey of said rotor wheel, a blade extending radially outward from the outer surface of the platform and a dovetail root portion slidably engaging one of said axially extending dovetail slots to retain said blade from radial separation from said rotor wheels; a disk member having a plurality of radial slots open at the periphery of said disk member; means joining said disk member to said rotor wheel to be adjacent to the protruding end of each of said blade platforms whereby the protruding ends overlie said radial slots; and two flat sided weights movable within each of said radial slots in said disk member, each of said weights having an oblique edge engaging the oblique edge of the other weight, each of said weights under a condition of rapid wheel rotation being cooperatively acted upon at their engaging oblique edges by centrifugal force acting to force one side of each of said weights into engagement with opposing sides of the radial slot in said disk member containing said weights and with one of said weights being simultaneously brought into engagement with the lower side of the protruding blade platform on said blade to thereby dampen the vibration of said blade.

2. The combination in a fluid transfer machine comprising: a rotor wheel having axially spaced end faces and axially extending dovetail slots in the periphery of said rotor wheel; a plurality of axially detachable fluid engaging blades radially extending from the periphery of said rotor wheel, each of said blades having a platform extending between the axially spaced end faces of said rotor wheel and protruding over one end face with the radially inner surface of the platform slidably engaging the periphery of said rotor wheel, a blade extending radially outward from the outer surface of the platform and a dovetail root portion slidably engaging one of said axially extending dovetail slots to retain said blade from radial separation from said rotor wheel; a disk member having a central circular hub portion of substantially the same diameter as said rotor wheel and a circular rim portion of reduced thickness circumferentially extending from the periphery of the central circular hub portion, the hub portion of said disk member containing a plurality of radial slots circumferentially spaced on the hub portion and open at the periphery and one face of the hub portion of said disk member; means joining said disk member to said rotor wheel with the rim portion of said disk member axially adjacent to the protruding end of each of said blade platforms whereby the protruding ends overlie the radial slots in said disk member; and two flat-sided weights movable within each of said radial slots in said disk member, each of said weights having an oblique edge engaging the oblique edge of the other weight, each of said weights under a condition of rapid wheel rotation being cooperatively acted upon at their engaging oblique edges by centrifugal force acting to force one side of each of said weights into engagement with opposing sides of the radial slot in said disk member containing said weights and with one of said weights being simultaneously brought into engagement with the lower side of the protruding blade platform on said blade to thereby dampen the vibration of said blade.

3. The combination in a fluid transfer machine comprising: a rotor wheel having axially spaced end faces and axially extending dovetail slots in the periphery of said rotor wheel; a plurality of axially detachable fluid engaging blades radially extending from the periphery of said rotor wheel, each of said blades having a platform extending between the axially spaced end faces of said rotor wheel and protruding over one end face with the radially inner surface of the platform slidably engaging the periphery of said rotor wheel, a blade extending radially outward from the outer surface of the platform and a dovetail root portion slidably engaging one of said axially extending dovetail slots to retain said blade from radial separation from said rotor wheel; a disk member having an inner and an outer face, a central circular hub portion of substantially the same diameter as said rotor wheel, a circular rim portion of reduced thickness circumferentially extending from the periphery of the central hub portion and flush with the outer face of said disk member, the hub portion of said disk member containing a plurality of radial slots circumferentially spaced on the hub portion and open at the periphery of said hub portion and the inner face of said disk member, the radial slots having parallel sides perpendicular to the inner face of said disk member; means coaxially joining said disk member to said rotor wheel with the inner face of said disk member adjacent to said rotor wheel and with the rim portion of said disk member axially adjacent to the protruding end of each of said blade platforms whereby the protruding ends overlie the radial slots in said disk member; and two flat weights movable within each of the radial slots in said disk member, each of said weights having opposing parallel sides adjacent to and in spaced relationship to the parallel sides of said radial slot to allow limited lateral movement within said radial slot and further having an oblique edge engaging the oblique edge of the other weight, each of said weights under a condition of rapid wheel rotation being cooperatively acted upon at their engaging oblique edges by centrifugal force acting to force one side of each of said weights into lateral engagement with opposing sides of the radial slot in said disk member containing said weights by lateral movement with each other along their adjacent oblique edges and with one of said weights being simultaneously brought into engagement with the lower side of the protruding blade platform on said blade to thereby dampen the vibration of said blade.

4. The combination in a fluid transfer machine comprising: a rotor wheel having a wheel disk radially terminating in a circular wheel rim having an axial width greater than the wheel disk and with end faces thereon, and axially extending dovetail slots in the periphery of said rotor wheel; a plurality of axially detachable fluid engaging blades radially extending from the periphery of said rotor wheel, each of said blades having a platform extending between the end faces on said rotor wheel and protruding over one end face with the radially inner surface of the platform slidably engaging the periphery of said rotor wheel, a blade extending radially outward from the outer surface of the platform and a dovetail root portion slidably engaging one of said axially extending dovetail slots to retain said blade from radial separation from said rotor wheel; a pierced disk member having an inner and an outer face, a central circular hub portion of substantially the same diameter as said rotor wheel, a circular rim portion of reduced thickness circumferentially extending from the periphery of the central hub portion and flush with the outer face of said disk member, and a circular retaining flange axially extending from the inner face at the inside diameter of said pierced disk member, the hub portion of said pierced disk member containing a plurality of radial slots circumferentially spaced on the hub portion and open at the periphery of said hub portion and the inner face of said pierced disk member, the said radial slots having parallel sides perpendicular to the inner face on said pierced disk member; means coaxially joining said pierced disk member to the wheel rim on said rotor wheel with the inner face of said pierced disk member adjacent to said wheel rim and the circular retaining flange on said pierced disk member engaging the inside diameter of the wheel rim on said rotor wheel and with the circular rim portion of said pierced disk member axially adjacent to the protruding end of each of said blade platforms whereby the protruding ends overlie the radial slots in said pierced disk member; and two flat weights movable within each of the radial slots in said disk member, each of said weights having opposing parallel sides adjacent to and in spaced relationship to the parallel sides of said radial slot to allow limited lateral movement within said radial slot and further having an oblique edge engaging the oblique edge of the other weight, each of said weights under a condition of rapid wheel rotation being cooperatively acted upon at their engaging oblique edges by centrifugal force acting to force one side of each of said weights into lateral engagement with opposing sides of the radial slot in said disk member containing said weights by lateral movement with each other along their adjacent oblique edges and with one of said weights being simultaneously brought into engagement with the lower side of the protruding blade platform on said blade to thereby dampen the vibration of said blade.

References Cited by the Examiner
UNITED STATES PATENTS

| | | | |
|---|---|---|---|
| 2,935,297 | 5/60 | Stalker | 253—77 |
| 2,997,274 | 8/61 | Hanson | 253—77 |
| 2,999,668 | 9/61 | Howald et al. | 253—77 |

KARL J. ALBRECHT, *Primary Examiner.*

HENRY F. RADUAZO, *Examiner.*